Dec. 22, 1964   J. F. BLACK ETAL   3,162,580
METHOD OF OPERATING NUCLEAR POWER PLANTS
Filed July 16, 1962

James F. Black
Frank T. Barr   Inventors
William J. Sweeney

By *Erwin M. Thomas*

Attorney

United States Patent Office 3,162,580
Patented Dec. 22, 1964

3,162,580
METHOD OF OPERATING NUCLEAR POWER PLANTS
James F. Black, Convent, and William J. Sweeney and Frank T. Barr, Summit, N.J., assignors to Esso Research and Engineering Company, a corporation of Delaware
Filed July 16, 1962, Ser. No. 209,985
7 Claims. (Cl. 176—39)

The present invention relates to an improved method for operating nuclear power plants. It has particular application to the use of an organic moderator fluid, preferably benzene, which because of its particular thermodynamic properties, can be used efficiently as a working fluid in addition to serving as coolant and moderator.

In the operation of atomic power plants, fissionable material such as U-233, U-235, Pu-239 and moderator are brought together in suitable proportions and under suitable conditions, so that a controlled chain reaction may be sustained with resultant generation of large quantities of heat and power, with relatively low fuel consumption. Due to the nature of the nuclear reactions, it is necessary to keep them under careful control so as to produce power efficiently without danger of runaway and explosions. As a general rule, water has been employed in atomic reactors as the coolant and as working fluid for prime movers such as steam turbines. The design of atomic reactors is such, however, that it is not feasible to operate them at the very high temperature and pressures which are used in the most modern and efficient power plants using conventional fuels. Moreover, water is highly corrosive to parts of the reactor and is explosive when it comes in contact with uranium at reactor operating conditions.

It has previously been suggested that various organic materials may be employed for controlling and moderating nuclear reactors. In prior art suggestions, such materials as cyclic oils of petroleum origin and synthetic hydrocarbons such as diphenyl etc. may be employed as moderator-coolants.

One difficulty with organic coolant-moderators in atomic energy plants is their tendency to degradation and decomposition under the operating conditions. On a molar basis, some of the higher boiling aromatics such as terphenyl would appear on the surface to be more suitable than lower boiling material such as benzene. Terphenyl, for example, has a "G" value of 0.2 molecule decomposed per 100 electron volts of radiant energy absorbed by the material. Benzene has a "G" value of 1.0, or five times that of terphenyl. However, the molecular weight of terphenyl is approximately three times that of benzene and so the "G" value ratio on a weight basis is about 1.5 to 1 for benzene vs. terphenyl. Considering the fact that benzene sells for approximately one-quarter the cost of terphenyl, it will be noted that there are economic benefits in the use of benzene as a coolant or moderator-coolant, assuming that decomposition products, etc. can be taken care of and prevented from fouling the reactor.

So far as applicants are aware, it has not seriously been suggested that benzene be used as a coolant or moderator-coolant. According to the present invention, however, benzene has particular advantages for this purpose and by subjecting the moderator-coolant to appropriate cycles of condensation, heat exchange, etc., a highly efficient over-all system may be effected.

According to the present invention, benzene in liquid form is subjected to heat exchange with spent benzene vapors to extract their heat and is passed through the nuclear reactor to receive heat from the fission taking place therein. The moderator-coolant is introduced into the reactor at relatively high pressure, preferably substantially above its critical pressure but not necessarily at the extremely high pressures used in high efficiency steam turbines. As will be pointed out below, by use of moderately high pressure and a temperature lower than the general range for steam in moderate temperature turbines, an over-all efficiency may be obtained which is considerably higher than that in the best steam turbines operating at comparable conditions.

The vaporized benzene under conditions which are preferably somewhat above critical temperature and pressure, is led to a multistage turbine where the vapors serve as the working fluid. At a suitable point, preferably just before or immediately after a first stage in the turbine, advantage may be taken of the special thermodynamic properties of benzene to separate heavy liquid portions. These tend otherwise to accumulate by reason of degradation of the benzene. The vapors are passed on through the turbine in continuous or successive stages to derive maximum power, and are taken off at reduced temperature and preferably subatmospheric pressure, to pass into heat exchange relationship with the incoming liquid moderator-coolant benzene.

From the heat exchanger, the cooled vapors approaching condensation temperature are further heat exchanged with a suitable condenser medium, preferably water, restoring the moderator-coolant to its original liquid condition at subatmospheric pressure.

In repeating the cycle, the liquid is pumped from subatmospheric pressure to a sufficiently high pressure, preferably above critical as previously noted, to pass through the heat exchanger and on through the nuclear reactor for expansion in the turbine, etc.

A particular object of the present invention as suggested above is to take advantage of the rather unusual thermodynamic properties of the moderator-coolant. Benzene, like certain related organic fluids, superheats as it expands isentropically while doing work, contrary to the tendency toward condensation exhibited by steam, as either descends from high temperature and pressure conditions. This property of benzene, together with other properties, makes it particularly suitable for returning very large proportions of its heat content by recycling. In addition, it makes it possible to drop out, periodically or continuously, a small fraction including heavy liquid which is formed by radioactive degradation of the moderator-coolant.

By using benzene as moderator, several advantages are gained. The critical temperature of benzene is substantially lower than that of water and it is possible to operate the reactor at a temperature substantially above the critical temperature of benzene without going to excessively high pressure. It is another object of this invention to take advantage of the thermodynamic characteristics of benzene to obtain unusually high form of operating efficiency. While benzene is degraded somewhat in the reactor, the present invention contemplates a simple and effective means of full stream purification by which the heavy ends, such as polymers and other degradation products, are continuously removed from the system. By reason of this feature, there is no danger of the serious fouling of the reactor which has been experienced with other organic moderator-coolants, particularly those using side stream purification techniques. Ultimately an equilibrium is reached beyond which no heavier molecules are formed because the precursors of such molecules have been reduced or entirely eliminated.

Other objects will be apparent as this description proceeds, and therefore reference will next be made to the attached drawings.

Figure 1:
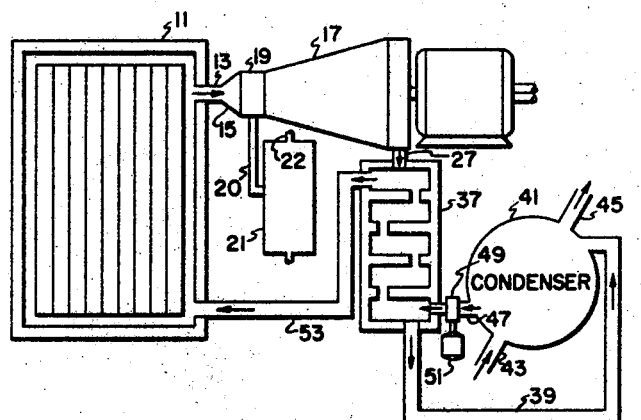
FIG. 1 is a diagrammatic view of a system showing operation of an atomic reactor and attendant power plant means, and showing the recycling, heat exchanging, etc. of the moderator-coolant.

Referring to FIG. 1, a heat source is shown in the form of a nuclear reactor 11 in which a chain reaction takes place, heat being transmitted to a cooling liquid, in this case liquid benzene. The benzene is below its critical temperature when it enters the reactor and at a pressure of about 800 pounds. The heat of reaction raises the temperature of the liquid substantially above its critical temperature to about 800° F. The vapor is led through line 13 to an expansion zone where it is expanded at least slightly to drop out heavy liquid ends. This may be the first stage 15 of a turbine 17. As the vapor expands in passing the first stage, some liquid condenses which is removed by an interstage separator 19. This may be any suitable trap or cyclone. From the trap, liquid is drained through line 20. The removed liquid is taken to a still 21. Here the heavy polymer or other degradation products resulting from radiation are separated. The benzene may be returned to the system at an appropriate point through outlet 22.

The uncondensed vapors pass on to the main or second stage of the turbine 17 where further expansion takes place. Since this expansion results in superheating because of benzene's special thermodynamic characteristics, further condensation is not likely to occur. Should condensed liquid be formed due to large heat removal, provision may be made for further withdrawal through a suitable seperator such as a cyclone or centrifuge, etc., not shown.

The spent vapors from the turbine are now passed through line 27 at very low pressure and considerably reduced in temperature, i.e., about 460° F., under the conditions described above. The vapor then passes to a heat exchanger 37. Here the residual heat in the vapors is utilized to preheat the liquid benzene which is being returned to the heat source. Finally, after heat exchange, the vapor, now at a temperature of about 140°, is forwarded through line 39 to a condenser 41. The latter is water cooled, the cooling water being brought in through line 43 and discharged at a temperature of 90 to 115° F. through line 45. With this system, the vapor pressure is brought below atmospheric (with cooling to 120° F., to about 4.5 p.s.i.a.), and the vapors are completely recondensed.

Condensed liquid is next returned to the nuclear reactor or heat source through line 47 and through a pump 49 driven by an appropriate prime mover 51. Here the liquid is pumped to the high pressure of about 800 p.s.i.a. prior to heat exchange with the spent vapor. The reheated liquid now goes through line 53 to the heat source or reactor 11 where the cycle is repeated.

Inasmuch as some degradation will take place in the benzene, the withdrawal point or points for minor liquid fractions, such as 20, afford opportunity for full stream purification through removal of polymer and other degradation products. When so treated, the remaining portion of the withdrawn liquid may be returned to the system so that the net consumption of benzene is not much greater than the actual degradation due to radiation and related causes.

It will be noted that in passing the benzene through the turbine, the quantities of liquid removed are very small because, notwithstanding the expansion and removal of energy from the vapors, there is an appreciable degree of superheating during expansion. The system thus takes advantage of this property of benzene, a property not shared by water.

Figure 2:
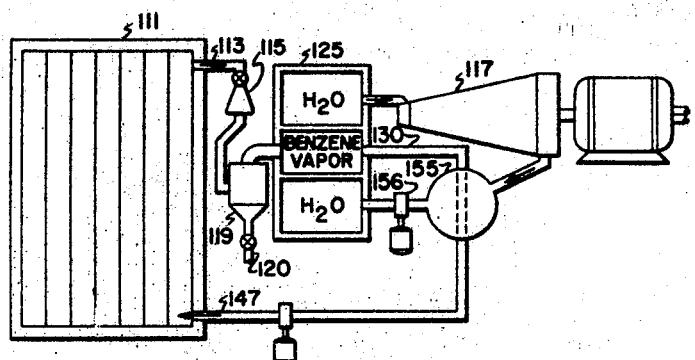
FIG. 2 is a similar view of a modified system using heat exchange and a conventional steam turbine.

In FIG. 2 a system is shown which makes it possible to use conventional steam turbines and still retain most of the advantages of the present invention. A heat source or nuclear reactor 111 is cooled and moderated by liquid benzene. During the process, the moderator is heated well above its critical point (289° C.) to a temperature around 800° F. The superheated vapors emerge through line 113 to an expander 115 where moderate expansion is permitted without ding work. Minor fractions of liquid including the heavy ends are condensed out and separated in any suitable separator such as cyclone 119. The liquid products may be removed through line 120.

The vapors, now free from liquid particles, are passed in heat exchange with water or water vapor to produce steam of sufficiently high temperature for effective use in the turbine 117. After heat exchange at 125, the benzene, now condensed, is taken at substantially reduced temperature through line 130 to be pressurized by the pump 149 (around 800 p.s.i.a.) for return to the reactor.

The details of the steam turbine system are not shown but conventionally would include a condenser 155 and a pressurizing pump 156, plus other conventional equipment.

Figure 3:
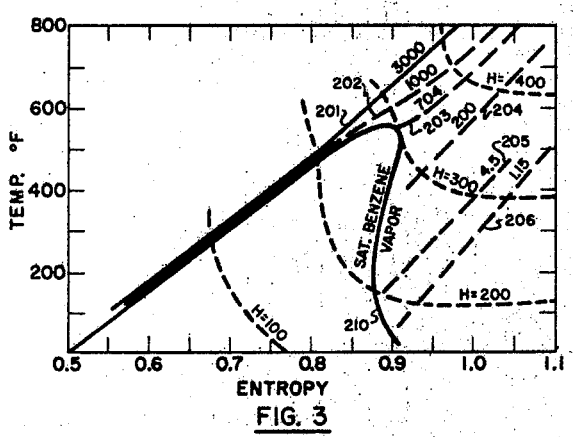
FIG. 3 is a temperature-entropy chart for benzene.

Referring to FIG. 3, this is a temperature-entropy chart of benzene showing the pressure curves 201, 202, 203, 204, 205 and 206 at pressures respectively of 3,000, 1,000, 704, 200, 4.5 and 1.15 pounds per square inch absolute. The chart also shows the enthalpy curves where $H=100$, $H=200$, etc. The saturated benzene vapor curve is shown at 210 and it illustrates the reduction in entropy between the supercritical pressure and the subatmospheric. As noted above, the condenser reduces the pressure on the spent vapors to about 4.5 p.s.i.a.

Figure 4:
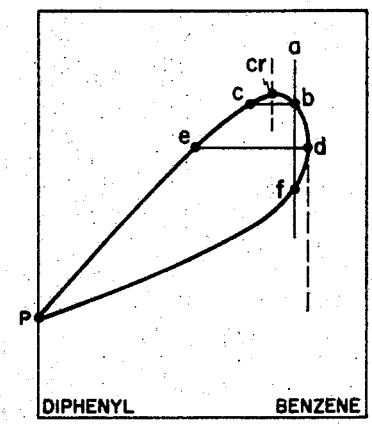
FIG. 4 is a constant temperature vapor-liquid equilibrium diagram showing a typical mixture of benzene with a higher boiling material (diphenyl is used as an example).

FIG. 4 shows the technical basis whereby, using benzene and assuming its degradation primarily to low polymers, the nuclear reactor may be operated. This makes it possible to choose conditions which prevent fuel element fouling by the moderator liquid. In effect, the full coolant stream is purified by continuous or substantially continuous condensation of the heavy ends. The organic effluent from the core of the reactor emerges above its critical temperature so no liquid products remain in the reactor. Liquid portions, including high boiling degradation products are withdrawn after initial expansion, either by valve or in a first stage of the turbine. Withdrawn liquid is collected at points such as 20 and thereby the build-up of objectionable and reactor fouling products such as polymers of high molecular weight is prevented. This occurs because no liquid which is approaching a molecular weight to cause fouling is allowed to remain in the reactor for a sufficient length of time. The products in the reactor cannot undergo sufficiently extensive polymerization or other degradation in a single cycle to cause trouble. Furthermore, in the cycle chosen there is no possibility of liquid condensate appearing as the vapors further expand in the turbine to cause trouble there.

Theoretical considerations will now be shown to support the foregoing statements. Referring to FIG. 4 in detail, assuming that benzene has been partly polymerized to diphenyl (with some $H_2$ liberation), the coolant leaving the reactor core is considered to be in the vapor phase and has the approximate percentage composition of diphenyl and benzene indicated by the vertical line $a$. This is obviously an oversimplification since there are other components present besides diphenyl and hydrogen, but the figure illustrates and is closely typical of the system described. It is adapted from "Thermodynamics and Physics of Materials," edited by Frederick D. Rossini, vol. I, page 489 (pub. 1955) by Princeton University Press). This stream is to be purified by reducing the pressure, for example, through a first stage of the turbine, to permit a liquid phase to separate. As the pressure is reduced below critical point $cr$, the composition of the mixture follows the line $a$–$b$ until it reaches point $b$.

Condensation begins to take place here. Further reduction in pressure causes the vapor composition to follow curve b–d while the composition of the liquid follows the curve c–e. Condensation of heavy fractions continues. At any time after the pressure has been reduced to a level indicated, for example by line d–e, but before the pressure drops to the level of point f, the liquid phase may be removed. Evaporation of liquid starts on passing point d. As a result of these thermodynamic characteristics, the vapor can be expanded in the turbine without appreciable condensation taking place during the expansion cycle after the initial condensation of a small amount of the less volatile fraction. The liquid phase removed by this process contains substantially all of the high boiling degradation materials and their immediate precursors. This liquid may be fractionated further at suitable pressures, or even at atmospheric pressure if desired, not only to take out objectionable constituents, but also to recover any desired fraction, e.g., diphenyl, terphenyl, and the like. Normally one will return the purified benzene to the system. This cycle is isenthalpic expansion.

The invention thus makes it possible to recover valuable by-products produced in the degradation of the moderator-coolant. Since polymerization is the dominant form of degradation, the primary degradation products are diphenyl and terphenyl. By proper control of the condensation and recovery steps, these may be obtained in reasonable concentrations and may, in fact, more than compensate for the degradation and loss of benzene in the process. As noted above, the process can be so controlled, by controlling the first expansion stage and the liquid recovery at that point, that an equilibrium composition emerges continually from the reactor. The heavy ends can be "skimmed" off at a level to provide maximum economic return while maintaining a clean reactor and using a constant equilibrium mixture as the organic coolant.

In summary, benzene is an inexpensive moderator, not unduly susceptible to degradation in the reactor. Its first step degradation products (diphenyl, terphenyl) are also reasonably good moderators. They can be partly removed as fast as they are formed. The removed fractions include all the higher-boiling degeneration products. Hence reactor fouling is completely prevented. Reaction products of value also can readily be recovered, reducing or compensating fully for make-up costs of benzene.

Benzene as a working fluid raises the efficiency at the turbine to about 42 to 43% as compared with about 35 to 36% for steam under comparable pressure and temperature conditions. This is done by operating well above critical temperature. Working pressures in the nuclear reactor are kept moderate (around 800 p.s.i.a.) without sacrificing high efficiency at the turbine. As pointed out above, it is advantageous to operate with the moderator liquid in the reactor at a pressure well above critical. This avoids boiling and consequent variations in density of the moderator, which cause variations in the moderating effect. However, boiling water reactors can be operated despite this deficiency and the benzene system can likewise, if desired, be operated at lower pressure, i.e., under boiling conditions. High operating efficiency can, in fact, be obtained at 600 p.s.i.a.

The high efficiency cycle with benzene can be operated without the clean-up procedure if other steps are taken such as frequent moderator changing, etc., to prevent reactor fouling. Another point to be noted is that a small amount of permanent gases such as hydrogen will be produced. These will be removed periodically, e.g., by a suitable bleed (not shown) at the condenser 41, FIG. 1, or after the heat exchanger 125, FIG. 2, as will be obvious.

On the basis of the thermodynamic data of FIG. 3, the operating characteristics and efficiencies of Table I are calculated.

TABLE I

*Ideal Efficiency of Desuperheating Regenerative Benzene Vapor Turbine Cycle Compared to Steam at Comparable Conditions*

| Turbine Inlet | Benzene | | Water | |
|---|---|---|---|---|
| Pressure, p.s.i.a. | 600 | 800 | 600 [1] | 800 |
| Temperature, °F. | 800 | 800 | 700 [1] | 700 [1] |
| Turbine Exhaust: | | | | |
|   Pressure, p.s.i.a. | 4.5 | 4.5 | 1.7 | 1.7 |
|   Temperature, °F. | 475 | 460 | 20% Moisture. | 22% Moisture. |
| Regenerator: | | | | |
|   Vapor In, °F. | 475 | 460 | | |
|   Vapor Out, °F. | 140 | 140 | | |
|   Liquid In, °F. | 120 | 120 | | |
|   Liquid Out, °F. | 400 | 375 | | |
| Condensation Temp., °F. | 120 | 120 | 120 | 120. |
| Condensation Press., p.s.i.a. | 4.5 | 4.5 | 1.7 | 1.7 |
| Ideal Efficiency, percent | 42 | 43 | 35 | 36. |

[1] Reduced from the 800° F. used with benzene because of the corrosive properties of water in a nuclear reactor.

What is claimed is:
1. The method of operating an atomic reactor which comprises passing preheated liquid benzene at supercritical pressure continuously into the reactor wherein the benzene takes up heat of reaction to raise the temperature of the benzene above its critical temperature accompanied by radioactive degradation of part of the benzene to higher boiling polymers in such proportion so that said polymers are carried as vapors in the benzene passing through the reactor and are continuously removed thereby as they are formed from the reactor, passing said benzene at supercritical temperature, removed from the reactor to a turbine, condensing said high boiling polymers as heavy liquid ends in said benzene as it is expanded with a pressure drop before complete passage through the turbine, removing said heavy liquid ends from the benzene remaining as vapor before complete passage of the benzene as vapor through the turbine, withdrawing effluent benzene vapor from the turbine under reduced pressure to a heat exchange zone for effecting therein heat exchange between said effluent benzene vapor and liquid benzene which is thus preheated and is the preheated liquid benzene passing continuously into the reactor, condensing said effluent benzene vapor cooled in the heat exchange zone to liquid benzene, and returning with pumping the resulting condensed liquid benzene as the liquid benzene preheated in the heat exchange zone passing continuously at supercritical pressure into the reactor.

2. The method according to claim 1, wherein benzene vapor expanding on passage through the turbine and containing the high boiling polymers condensed as heavy liquid ends is subjected to centrifuging between turbine stages to remove said heavy liquid ends.

3. The method of operating a nuclear reactor which comprises passing liquid benzene as moderator-coolant into said reactor at supercritical pressure but below the critical temperature of benzene, continuously withdrawing from the reactor the benzene heated to a supercritical temperature and pressure and containing degradation products resulting from radiation of the heated benzene in minor quantities, said degradation products including polymers higher boiling than benzene, removing by partial condensation said degradation products higher boiling than benzene from the benzene withdrawn from the reactor, using the heated benzene withdrawn from the reactor minus the removed degradation products as an energy source, thereafter reliquefying the benzene used as a heat energy source and returning the resulting liquid benzene at supercritical pressure to the reactor.

4. The method according to claim 3, wherein the heated benzene withdrawn from the reactor is used as the energy source by being employed as a working fluid in a turbine.

5. The method according to claim 3 wherein the heated benzene withdrawn from the reactor is used as the energy source by being employed to heat a working fluid of a turbine through heat exchange.

6. The method according to claim 3 wherein the higher-boiling degradation products removed from the benzene are polyphenyls including diphenyl and terphenyl, which are primary degradation products and which are condensed to liquid phase.

7. The method of operating a nuclear reactor for generating power at high efficiency which comprises passing benzene as a moderator-coolant into a nuclear reactor at supercritical pressure, heating said benzene in said reactor to at least 100° F. above its critical temperature, continuously removing from the reactor the benzene as an effluent fluid stream at above the critical temperature and pressure of benzene and containing as heavy ends substantially all high-boiling degradation products formed in the reactor, separating said heavy ends as condensed liquid products from the full benzene effluent as it is expanded with lowering of the benzene pressure while the benzene is at above its critical temperature, expanding the benzene effluent freed of said heavy ends as a working fluid in an engine so that its pressure is reduced to below the critical pressure and to below atmospheric pressure, and heat exchanging the thus expanded benzene in vapor phase with liquid benzene being heated thereby and being returned to said reactor as moderator-coolant to achieve an overall thermal efficiency in excess of 40% while maintaining a working pressure in the reactor above the critical pressure of benzene and below about 1000 p.s.i.

References Cited in the file of this patent

UNITED STATES PATENTS

| | | |
|---|---|---|
| 2,883,331 | Bolt | Apr. 21, 1959 |
| 3,061,533 | Shannon et al. | Oct. 30, 1962 |
| 3,085,964 | Ritz et al. | Apr. 16, 1963 |

FOREIGN PATENTS

| | | |
|---|---|---|
| 697,601 | Great Britain | Sept. 23, 1953 |

OTHER REFERENCES

TID–7007 (Part 1), Compilation of Organic Moderator and Coolant Technology, U.S.A.E.C., January 4, 1957, pp. 179–182, 187, 189–191, 193.